Patented July 12, 1932

1,866,608

UNITED STATES PATENT OFFICE

BERNHARD WURZSCHMITT, OF UERDINGEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF CHROMIUM OXIDE

No Drawing. Application filed December 7, 1928, Serial No. 324,588, and in Germany December 10, 1927.

The invention relates to the manufacture of chromium oxide.

I have found that a very pure chromium oxide excellently suitable for use as a pigment and for the manufacture of metallic chromium is obtained by causing chromates or bichromates to react with such quantities of phosphorus that the formation of chromium phosphates is essentially excluded. In the case of potassium bichromate the principal reaction appears to be the following:—

$$3K_2Cr_2O_7 + 2P = 2K_3PO_4 + 3Cr_2O_3 + 4O.$$

The quantity of red phosphorous used, therefore, ought not to exceed 8 per cent of the potassium bichromate. There are thus obtained in almost theoretical yield a very finely divided chromium oxide of high coloring strength and of great brilliancy and potassium phosphate.

The process can be carried out, for example, by igniting an intimate mixture of red phosphorus, with a chromate, preferably with alkali metal bichromate and allowing it to burn away and separating the reaction product obtained by lixiviating, if necessary, with an acid. The mixture of phosphorus and potassium bichromate may also be heated first to a definite temperature, say, to 300° C. and then be ignited, or care may be taken to cool the reaction mixture during burning, or a solid inert diluent such as chromium oxide or chromium hydroxide may be admixed with the reaction mass. Particularly satisfactory action is attained when the phosphorus-potassium bichromate mixture is made into a paste with a little water and thereafter caused to react. Moreover, other reducing agents, such as for example, carbon or sulphur can be added for the purpose of binding the oxygen set free.

The invention is illustrated by the following examples:—The parts are by weight.

Example 1

166.4 parts of potassium bichromate are mixed thoroughly with 12.4 parts of red phosphorus and the mixture is ignited from the surface in an iron vessel. After burning the reaction mixture is dissolved in water and the chromium oxide produced is separated by filtration from the potassium phosphate lye, from which solid potassium phosphate is recovered in the known manner by evaporating and crystallizing. The chromium oxide is dried and represents a blueish green pigment, suitable for use as a paint without further treatment.

Example 2

156.4 parts of potassium bichromate and 12.4 parts of red phosphorus are made into a paste with 30 parts of water and further treated as in Example 1. The chromium oxide obtained is a bright green product of particularly high coloring power.

In the following claims the expression "chromate" is intended to comprise a monochromate as well as a bichromate.

I claim:

1. A method for producing chromic oxide which comprises mixing an alkali metal chromate with such an amount of phosphorus as causes the formation of alkali metal phosphate only, igniting the mixture, and separating the chromic oxide from the alkali metal phosphate by dissolving the reaction mixture in water and filtering off the chromic oxide from the potassium phosphate lye.

2. A method for producing chromic oxide which comprises mixing an alkali metal chromate with such an amount of red phosphorus as causes the formation of alkali metal phosphate only, igniting the mixture, and separating the chromic oxide from the alkali metal phosphate by dissolving the reaction mixture in water and filtering off the chromic oxide from the potasium phosphate lye.

3. A method for producing chromic oxide which comprises mixing an alkali metal chromate and another reducing agent with such an amount of phosphorus as causes the formation of alkali metal phosphate only, igniting the mixture, and separating the chromic oxide from the alkali metal phosphate by dissolving the reaction mixture in water and filtering off the chromic oxide from the potassium phosphate lye.

4. A method for producing chromic oxide which comprises mixing an alkali metal chromate with such an amount of red phosphorus as causes the formation of alkali metal phosphate only, in the presence of an amount of water not exceeding 20% of the alkali bichromate phosphorus mixture, igniting the mixture, and separating the chromic oxide from the alkali metal phosphate by dissolving the reaction mixture in water and filtering off the chromic oxide from the potassium phosphate lye.

5. A method for producing chromic oxide which comprises mixing 156.4 parts of potassium bichromate and 12.4 parts of red phosphorus, making said mixture into a paste with 30 parts of water, igniting the paste and separating the chromic oxide from the alkali metal phosphate by dissolving the reaction mixture in water and filtering off the chromic oxide from the potassium phosphate lye.

In testimony whereof I have hereunto set my hand.

BERNHARD WURZSCHMITT.